Figures 1, 2:
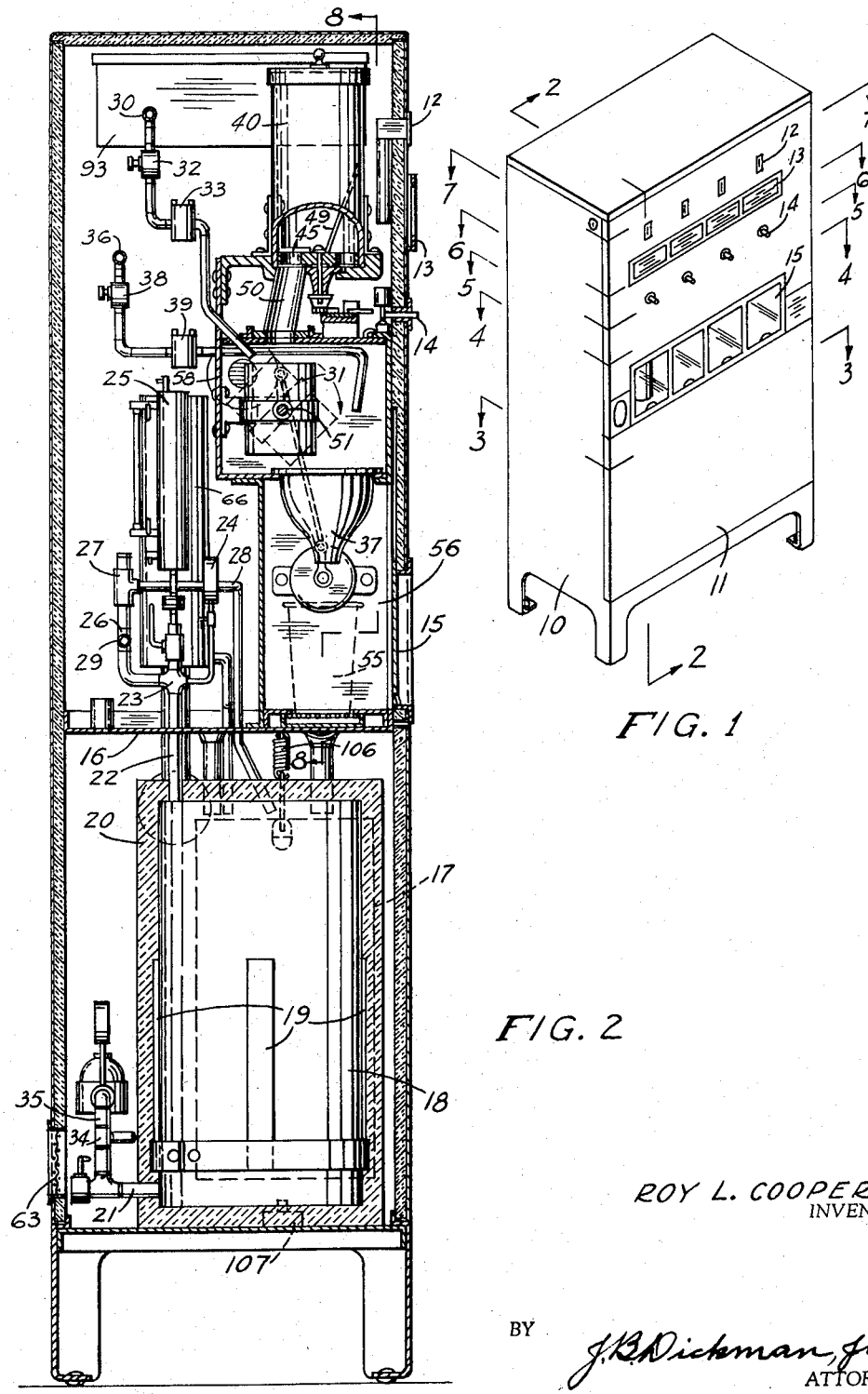
Figure 3:
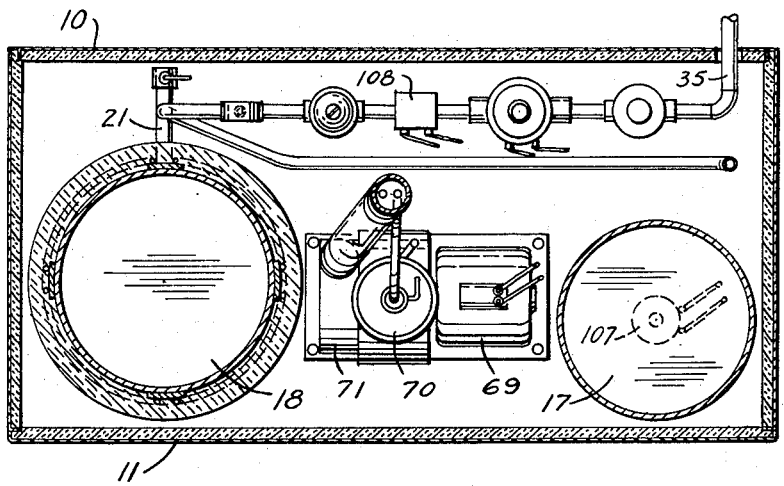
Figure 4:
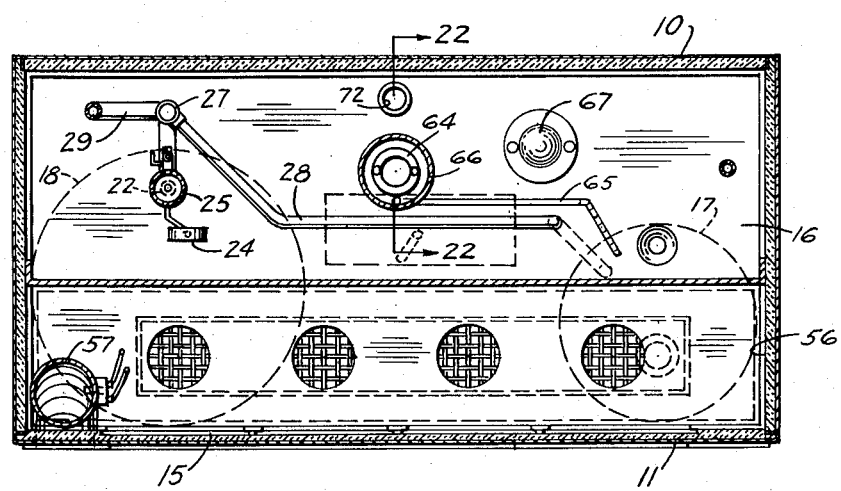
Figure 5:
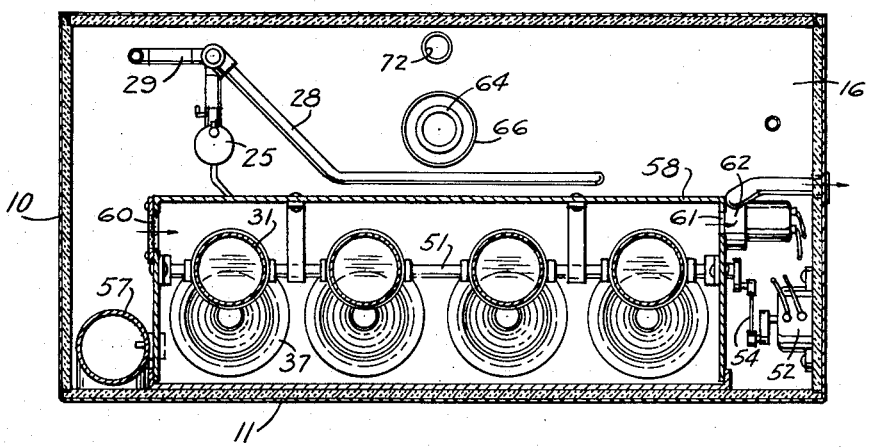
Figure 6:
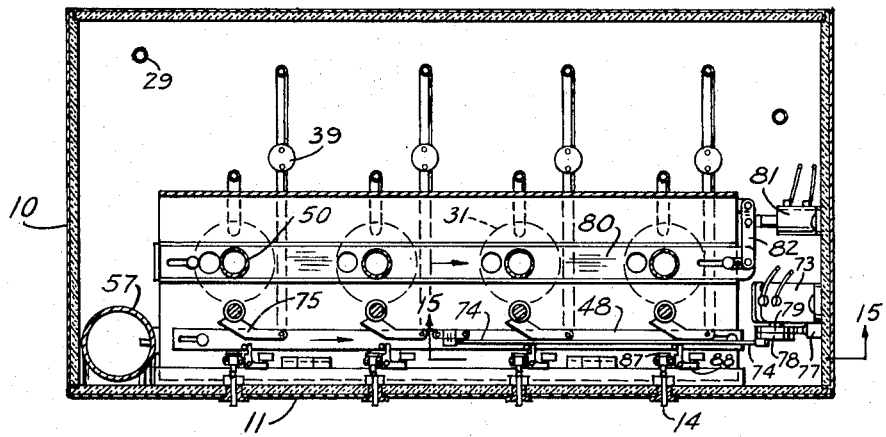
Figure 7:
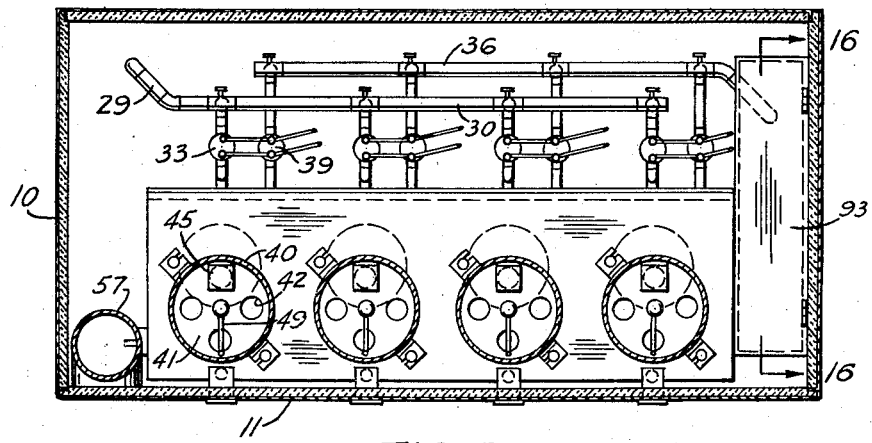

June 10, 1958 R. L. COOPER 2,838,077
DISPENSING MACHINE FOR BEVERAGES
Filed Oct. 20, 1954 9 Sheets-Sheet 1

ROY L. COOPER
INVENTOR

BY J. B. Dickman, Jr.
ATTORNEY

June 10, 1958 R. L. COOPER 2,838,077
DISPENSING MACHINE FOR BEVERAGES
Filed Oct. 20, 1954 9 Sheets-Sheet 2

ROY L. COOPER
INVENTOR

BY J. B. Dickman, Jr.
ATTORNEY

June 10, 1958     R. L. COOPER     2,838,077
DISPENSING MACHINE FOR BEVERAGES
Filed Oct. 20, 1954     9 Sheets-Sheet 3

ROY L. COOPER
INVENTOR

BY J.B.Dickman, Jr.
ATTORNEY

ROY L. COOPER
INVENTOR

June 10, 1958  R. L. COOPER  2,838,077
DISPENSING MACHINE FOR BEVERAGES
Filed Oct. 20, 1954  9 Sheets-Sheet 5

ROY L. COOPER
INVENTOR

BY
J. B. Dickman, Jr.
ATTORNEY

June 10, 1958 R. L. COOPER 2,838,077
DISPENSING MACHINE FOR BEVERAGES
Filed Oct. 20, 1954 9 Sheets-Sheet 6

ROY L. COOPER
INVENTOR

BY J. B. Dickman, Jr.
ATTORNEY

June 10, 1958  R. L. COOPER  2,838,077
DISPENSING MACHINE FOR BEVERAGES
Filed Oct. 20, 1954  9 Sheets-Sheet 7
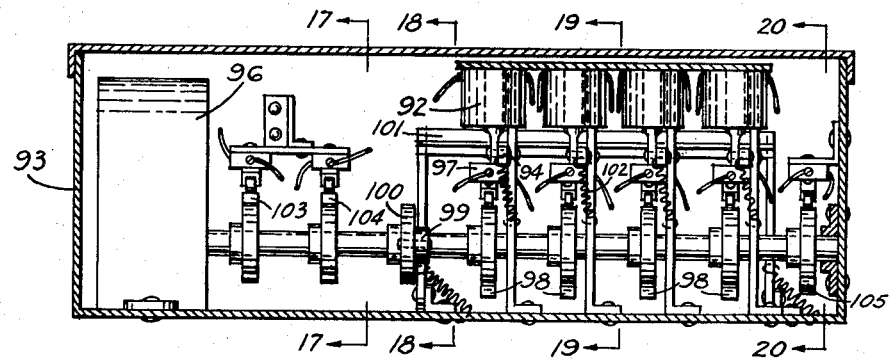
FIG. 16
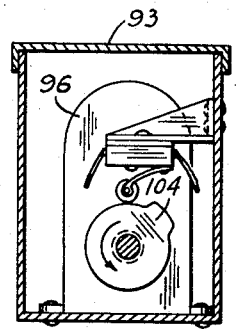
FIG. 17
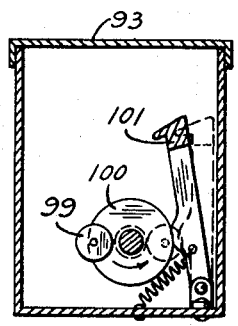
FIG. 18
FIG. 21
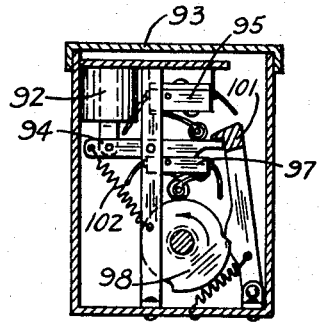
FIG. 19
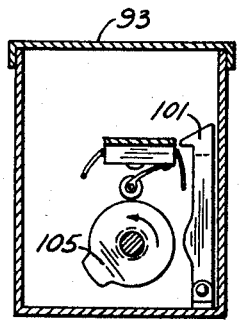
FIG. 20
INVENTOR.
ROY L. COOPER
BY
J. B. Dickman, Jr.

ROY L. COOPER
INVENTOR.

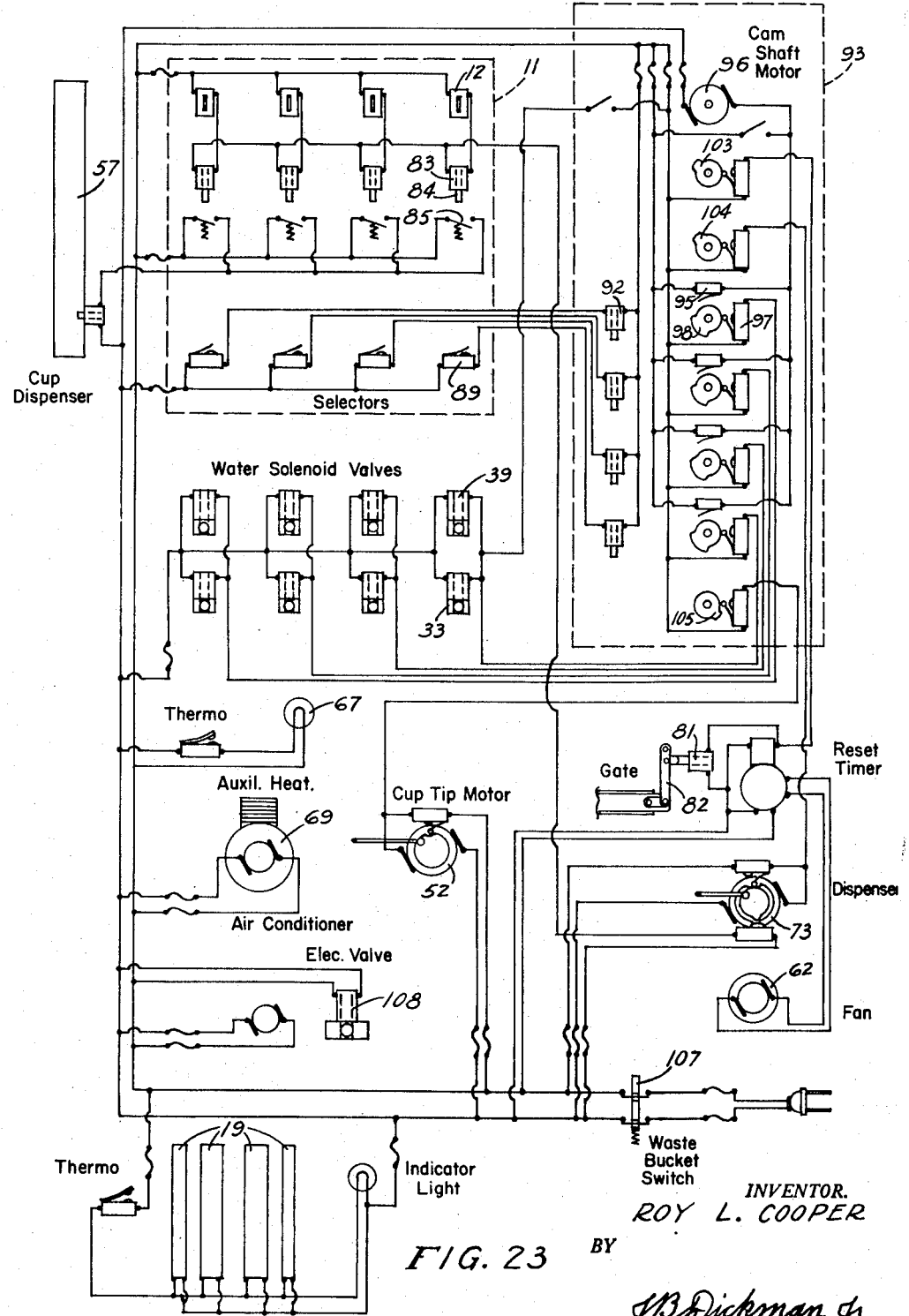

United States Patent Office 2,838,077
Patented June 10, 1958

2,838,077

DISPENSING MACHINE FOR BEVERAGES

Roy L. Cooper, Waterman, Ill., assignor to Waterman Engineering Company, Waterman, Ill., a corporation of Illinois Application October 20, 1954, Serial No. 463,342

15 Claims. (Cl. 141—82)

This invention relates to dispensing machines for beverages, such as coffee and tea as well as soups and other hot mixtures, which are prepared by mixing powdered or granulated materials with hot water.

It has been customary in the past in the operation of these machines to use rather tepid water in these mixtures to avoid excessive steaming within the cabinet portion of the machine where the powdered or solid ingredients of the mixtures are stored for dispensing into these hot mixtures, as well as to prevent scalding the customer's hands in handling the container. This does not make for good results as far as the mixtures are concerned, and neither does it entirely eliminate caking and deterioration of the powdered or solid ingredients due to some steaming which persists even at the lower temperatures. For example, coffee is best when the powder is mixed in almost boiling hot water which dissolves the powder completely and brings out the aroma in full. The poor quality of the coffee now obtainable from vending machines is primarily due to the incomplete solution of the powders and incomplete release of the full aroma of the coffee. Similarly, in making instant soups or boullions, only very hot water can produce complete solution of the soluble parts of the solid ingredients and fully resaturate the other parts to their normal consistency and taste in the few seconds available for mixing.

The principal object of the present invention is to produce a hot-mixture vending machine that will mix the solid ingredients with very hot water and immediately add a sufficient proportion of cold water to provide a resulting temperature in the finished mixture of the highest quality which although still hot will not be scalding hot and may be safely handled by the customer in the conventional disposable containers.

A further object is to separate the mixing chamber of the vending machine by impervious thermal insulation walls from the storage spaces for the solid ingredients and ventilate this chamber during the entire mixing period by suction to prevent any vapors escaping during this period thru the necessary dispensing connections in the mixing chamber into any space where they may do damage or produce caking of the solid ingredients.

Another object is to provide thermostatically controlled heating means in the cabinet of the machine to maintain an even temperature of about 100° F., while at the same time maintaining this air in a very dry condition by means of a dehumidifier so that dry warm air will always be available not only to maintain the solid ingredients in dry condition, but also to supply the ventilating air to the mixing chamber whenever ventilation therein is produced by an exhaust fan which discharges the air from this mixing chamber into the atmosphere.

Figure 8:
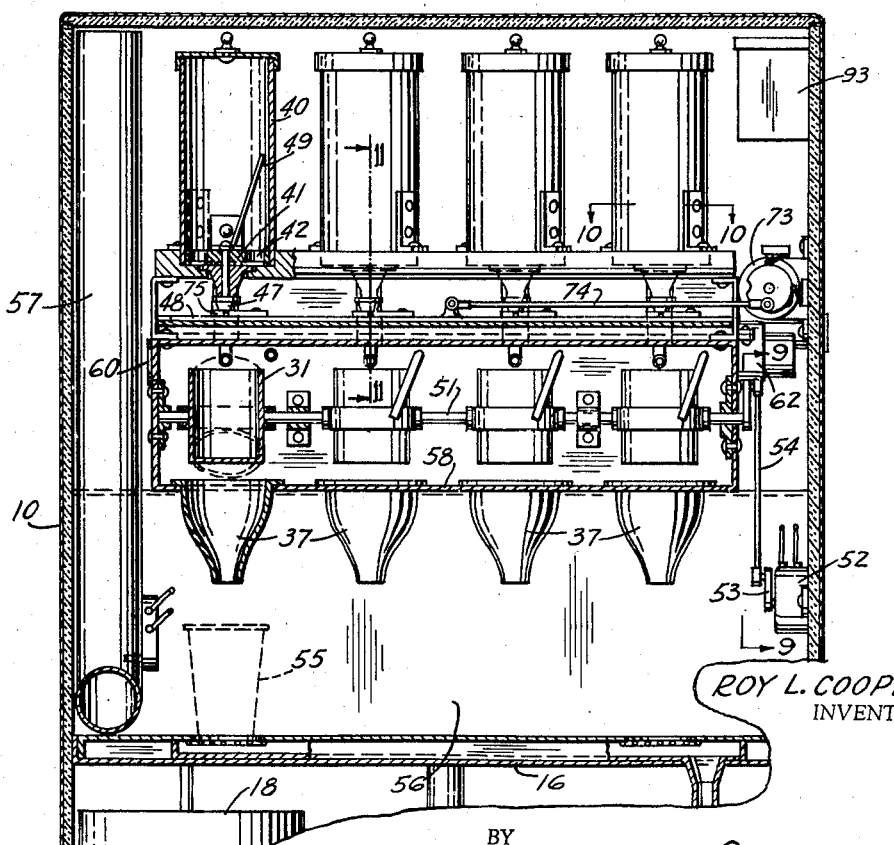
Figure 10:
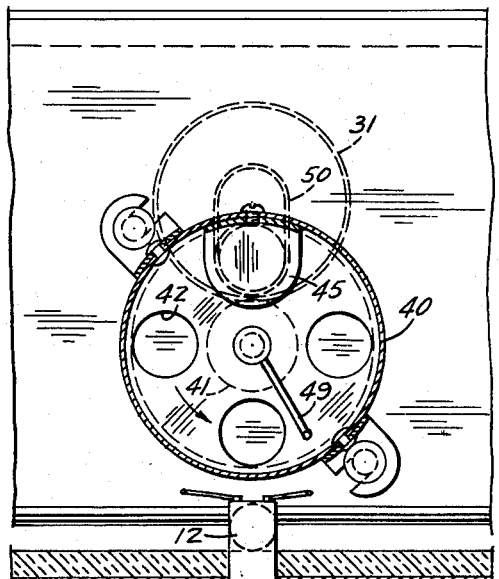
Figure 9:
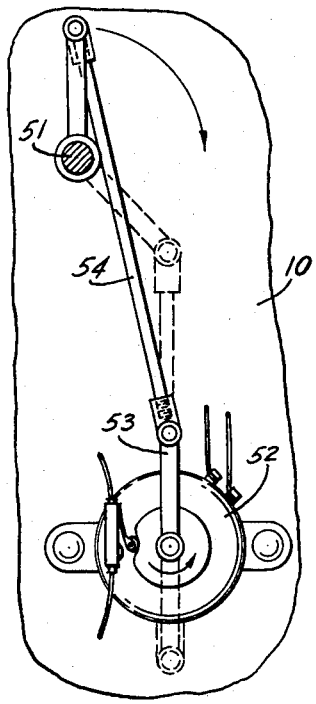
Figure 11:
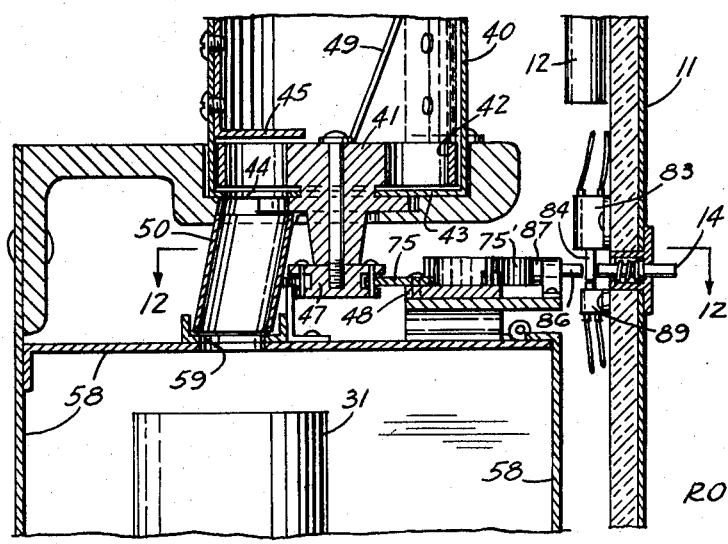
Figure 12:
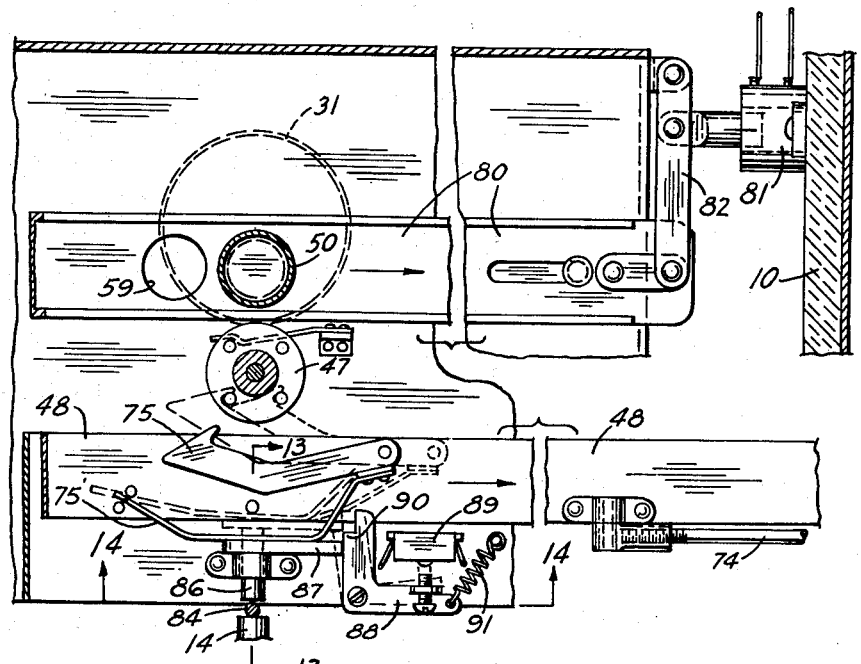
Figures 13, 14:
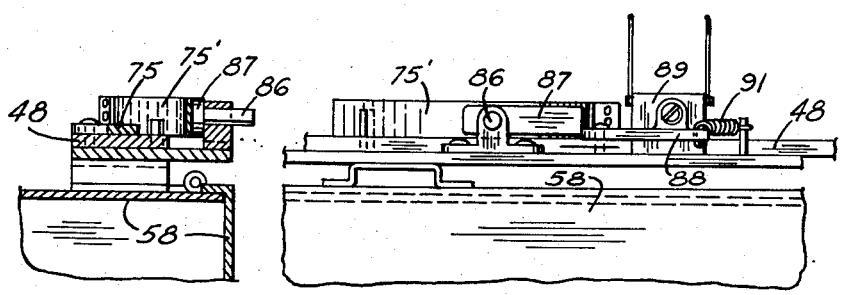
Figure 15:
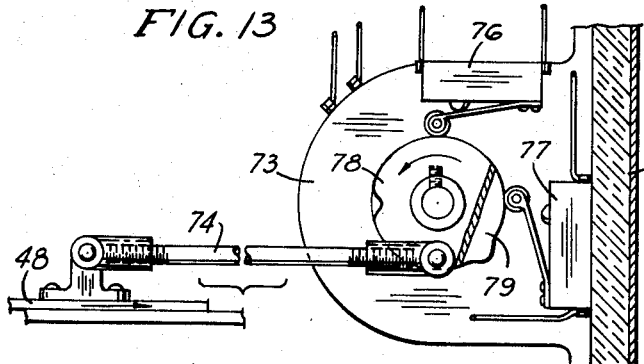
Figure 22:
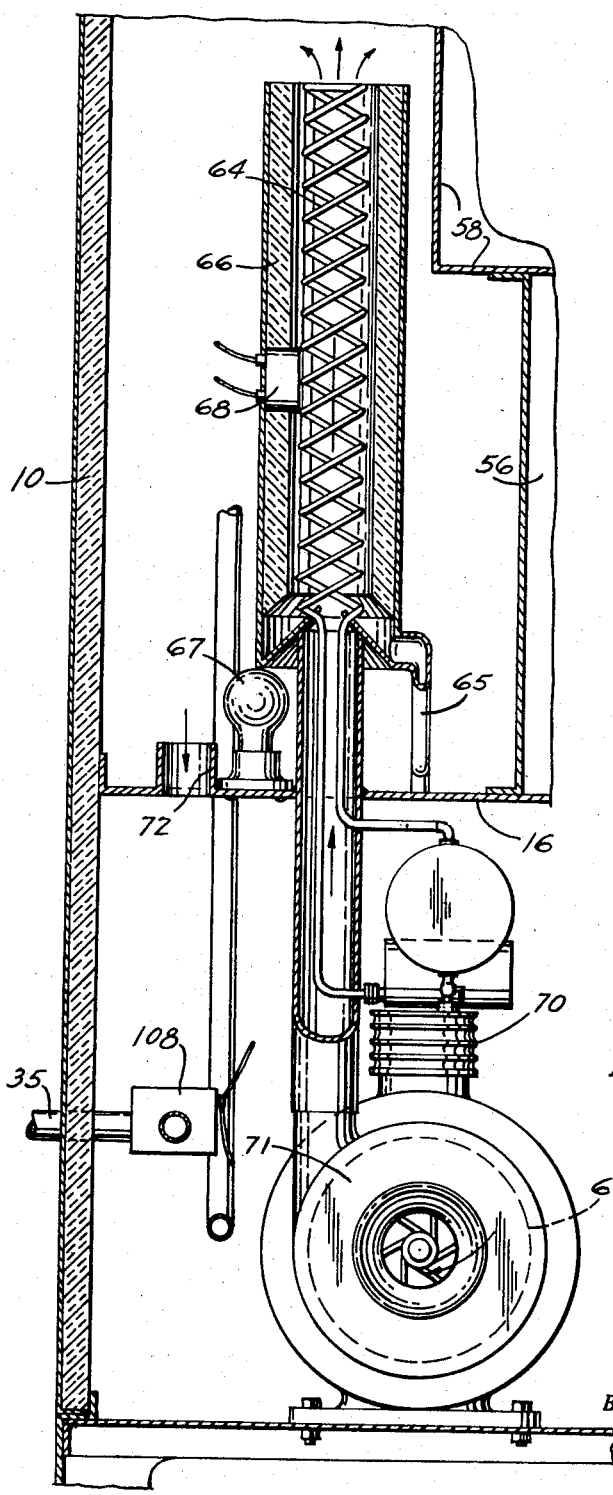

Further and more specific objects will appear in the following detailed description of the invention in its preferred form, as illustrated in the accompanying drawings, wherein:

Fig. 1 shows a perspective view of the vending machine,

Fig. 2 is a sectional view of the cabinet in a vertical plane taken through the lines 2—2 of Fig. 1, Figs. 3, 4, 5, 6 and 7 are horizontal sectional views through the cabinet along the lines similarly numbered in Fig. 1, Fig. 8 is a vertical sectional view taken along the line 8—8 of Fig. 2, Fig. 9 is a detail view of the cup-trip motor and the connecting linkage, Fig. 10 is an enlarged detail sectional view taken on the line 10—10 of Fig. 8, Fig. 11 is an enlarged detail sectional view taken on the line 11—11 of Fig. 8, Fig. 12 is a partial enlarged detail view showing portions of the dispenser slide and dispenser gate and their operating mechanisms, Fig. 13 is a partial detailed view taken on the line 13—13 of Fig. 12, Fig. 14 is a view taken on the line 14—14 of Fig. 12, Fig. 15 is a view of the dispenser motor and its camshaft operating the dispenser micro-switch and the interrupter micro-switch, as well as the crank for the link for reciprocating the dispenser slide, Fig. 16 is an enlarged detailed sectional view through the camshaft motor case taken on the line 16—16 shown in Fig. 7, Figs. 17, 18, 19 and 20 are sectional views taken on similarly numbered lines shown in Fig. 16, Fig. 21 shows the relative disposition on the camshaft of the cup-trip cam, the water cam, and the cam for starting the fan, opening the gate and starting the dispenser motor, as well as the roller for operating the hook-bar, Fig. 22 is a detailed view of the dehumidifier on an enlarged scale showing a portion of the diaphragm between the lower and upper sections of the cabinet, and the heater lamp in the upper section, and Fig. 23 shows a schematic wiring diagram for the various motors, heating units, thermal switches, micro-switches, solenoids, etc.

Before proceeding with the detailed description of the several figures of the drawing, it is well to go into the general description of the vending machine in which the present invention is incorporated.

To begin with, it must be understood that to successfully handle hygroscopic materials such as powdered and/or granulated food and beverage materials, the atmosphere which comes in contact with these materials must be very dry, i. e., it must have a very low relative humidity. And, if the machine is to have a tendency to remove dampness from these materials rather than having these materials remove moisture from the atmosphere within the machine, the air must be very dry indeed.

From practical experience, we know that in the winter time when the outdoor air is cold, even if the relative humidity is relatively high, say in the neighborhood of 70%, when this cold air comes into the house at a much higher temperature, its relative humidity drops to such a point that the atmosphere will actually draw the moisture out of the glue which holds the furniture together. The glue becomes so dry and brittle that the furniture sometimes comes apart. This is merely an illustration showing that the humid atmosphere at a low temperature may be made very dry by merely raising its temperature within a range of 30 or 40 degrees.

The machine illustrated is totally enclosed when operated and is only opened very briefly for servicing. The only opening for incoming air is in the lower section of the machine, and the only outlet is in the upper section of the machine where the air is blown out to draw any vapors released during the process of mixing the ingredients with hot water. It should be briefly stated, that the upper section of the machine is closed off from the lower section for safety reasons as well as for purposes of better control of the air circulation and dehydration thereof. The separation diaphragm or plate is for the primary purpose of insuring that any leaks of pipes or valves that may accidentally occur in the upper section will not flood the premises but will run down into the sump tank, which will, when approximately half full, shut off the electric current, closing the incoming water valve, and preventing water damage.

Furthermore, the machine is inclosed in a case which is insulated. It was found that Celotex is a good insulation. It can be bonded directly to the metal. After installation, this Celotex insulation is sprayed with a water resistant cement. This is economical and effective in preventing heat loss and keeping the outside of the case reasonably cool, and in preventing the machine from radiating disagreeable heat in warm weather, as well as damping the sound of the equipment operating inside.

The temperature of the air in the case is kept at about 100° F. This in turn keeps all metal cases and parts at a temperature at which any excess moisture would not have a tendency to condense thereon. However, the fact remains, that if we blow air out we must take air in to replace it, and the air from the outside must be conditioned as quickly as possible after entering the case, by removing all the water therefrom that is practicably possible.

For this purpose we use an electric motor and compressor with a refrigeration coil. It will be noted that the motor and compressor with integrally included fan and sump tank for the refrigerant are located in the lower section of the case. However, the cooling or low pressure coil is extended up through a tube to the upper section of the case. This coil is surrounded by a very good insulation. The thermostat which automatically turns the compressor motor on and off is located behind the coil, i. e. between the coil and the insulation. When the coil warms up the compressor will start; when the compressor runs, air is picked up in the lower section of the case and blown up through the coil tube and returned through a descending tube opening provided in the diaphragm, to the lower section of the case. Water which is condensed out of the air, as it passes through the coil, will run down through a drain tube provided therefor into the main sump tank. Although the heat from the auxiliary case heater and the heat lost by the insulated hot water tank will heat up the interior of the case to approximately 100° F., the fact still remains, that as long as there is much moisture in the air, the coil, in condensing this moisture out of the air will warm up much faster than after the air has become dry. Since the coil tube is well insulated, a balance can be obtained where a satisfactory temperature adjustment of the thermostat controlling the cooling coil motor and the thermostat controlling the ultimate case temperature, will prevent excessive operation of the cooling motor. It is suggested that the temperature for starting the cooling motor be set for about 50° F. and will turn off the motor at approximately 40° F. In order to condense moisture out of the air at a temperature of 40° F., the air will beome saturated at this temperature and the excess moisture will condense on the coils and will then run down into the sump tank. Since the remaining air at 40° F. will contain moisture at 100% relative humidity, it is now necessary to warm up this air. Since air gains or doubles its capacity for carrying moisture for each 20° temperature rise, its capacity for carrying moisture at 100° F. will be about 6 times as much as at 40° F., and therefore its relative humidity will drop to about 16%. This is very dry, and sufficiently so to keep the powdered or granulated materials used in beverages from deterioration or caking in the dispensing passages.

The machine is set to prepare mixtures with hot water at a temperature of approximately 195° F., at which temperature it was found that the flavor of the beverages was much improved. At the same time it is desirable that the ultimate mixture when vended would have a temperature of approximately 155° F. This is accomplished, in the present machine, by adding 195° F. water to the dry ingredients in the amount of approximately ¾ of the desired ultimate quantity. The remaining ¼ is then added at a temperature of approximately 70° F., which results in a final temperature of approximately 155° F.

It was found that no one had previously made provisions for a mixing compartment which is entirely enclosed as in the present invention, and which is provided with a means of exhausting the hot water steam in a fashion to prevent any of this steam from reaching dry ingredients. Furthermore, it became quite obvious that if we were to handle very hygroscopic materials, such as soups, which contain liberal amounts of salt, then it would be necessary to dehydrate the air so that the constantly changing humidity of the atmosphere would be reduced and held to a minimum within the machine where it might damage free running quality of the dry materials. In fact, machines now on the market are causing trouble from atmospheric moisture causing powdered coffee to bridge or set.

The present invention is applied to a machine which vends a plurality of mixtures in view of the present trend to use this type of vending machines.

Referring now in detail to the drawings, Fig. 1 is a perspective view of the vending machine showing the cabinet 10 having a door front 11, coin slots 12, inscription plates 13, push buttons 14, doors 15, and container dispenser opening 15¹. The customers operate the machine by placing a coin in the coin slot over the inscription which describes the food or mixture which he desires, and then pushes the corresponding push button which starts the cycle by dropping a cup or container in the compartment below the push button behind the transparent door 15 and in a few seconds the mixture is dropped into the container and the cycle stops. So far this is all standard practice as far as the customer is concerned.

While the present invention is applied necessarily to only one form of coin slot, push button and dispenser arrangement, for purposes of illustration, it will be obvious that it may be similarly applied to any other arrangements of these parts that will be accompanied by the customary directions on the front of the dispensing machine, for their proper operation.

The general arrangement of parts inside the cabinet may be clearly seen in Fig. 2 including the novel features which form the present invention and which provide the customer with a superior product, while requiring a minimum of service to keep the machine in good operating order and well supplied with lasting quantities of ingredients in the storage spaces. At the same time sanitation is improved and the machine otherwise fully meets all the code requirements.

The diaphragm or plate 16 separates the upper and lower sections of the cabinet. Any water leaks in the upper section are caught by this plate and drained into a sump tank 17 shown in the lower section in dotted lines in this Fig. 2, since it is hidden in this view by the hot water tank 18 with heater elements 19 and insulation 20. The water inlet 21 is shown at the bottom of the tank, and the outlet 22 is at the top. The outlet leads to a cross 23 connected with a pressure gauge 24, an air cushion 25, and a T 26, which is further connected to a safety relief valve 27 which has a drain pipe 28 leading to the sump tank 17, and a conduit 29 leading to a manifold 30 near the top of the cabinet, which feeds the hot water to each mixing cup 31 through a manual valve 32 and a solenoid controlled valve 33.

The cold water is tapped off by a T connection 34 in supply line 35 near the inlet 21 at the bottom of tank 18; and connects with the manifold 36 in the upper section of the cabinet, which feeds the cold water to each of the mixing chamber funnels 37 through a manual valve 38 and a solenoid controlled valve 39.

The dry ingredients are stored in bins 40 located near the top of the upper section of the cabinet. Each bin 40 has dispensing means in its base, consisting of a rotatable plate 41 in the bottom of the bin with bores 42 through the plate spaced annularly around it to form pockets for measuring the amount of the ingredients needed for one serving. These pockets are closed at the bottom by the bottom 43 of the bin except for an opening 44 at the point of dispensation over which one of the pockets is brought by rotation of the plate 41 during each cycle to dispense the dry ingredients. The dispensing pocket is closed at its top by a shield 45 mounted in the bin over the plate at this point. The plate 41 is mounted on a shaft 46 passing through the bottom of the bin and having a sprocket 47 at the lower end for operation by a reciprocating slide 48, one tooth each cycle, which moves the consecutive pockets 42 into dispensing position.

This shaft 46 carries a stirring rod 49 extending angularly upwardly in the bin to keep the dry ingredients free flowing and to prevent bridging or only partial filling of the pockets.

A chute 50 guides the dispensed dry ingredients into the mixing cup 31 which is mounted on horizontal spindles 51 and is brought into the upright position only during the mixing operation by a motor 52 with crank 53 and operating linkage 54, and is then tipped to deliver the mixture of the 195° F. water and the dry ingredients into the funnel 37 which has simultaneously received the cold water portion to form the final 155° F. mixture in the dispensing container 55 in the compartment 56 below the funnel. This compartment may have a glass front for the door 15, which may be lifted for removal of the serving when completed. Obviously, the dispensing container 55 may be automatically dropped into position in the compartment 56 at the start of a cycle by well known means, or it may be separately supplied and the cycle started when the customer places the container in position under the funnel.

In the present illustration the containers 55 are dispensed separately by the dispenser 57 at the left of the machine. The customer takes the container and places it in the proper compartment, then starts the cycle by pressing the corresponding push button 14.

It will be noted that the chamber where the mixing cups are located is sealed off by walls 58 from the rest of the upper section of the cabinet except for the funnel openings in the bottom, the slide valve openings 59 at the top which are opened during the dispensing period, a screened inlet 60 for admission of ventilating air from the upper section of the cabinet at one end of the chamber, and an exhaust opening 61 at the other end of the chamber for connection to the exhaust fan 62 which blows the air out into the atmosphere at the side of the cabinet.

The cabinet has a screened inlet 63 for air near the bottom preferably in the rear wall. The air coming in from the outside is dehumidified by passing it through a cooling coil 64 at a temperature of about 40° F. into the upper section. In the process of cooling any excessive moisture is precipitated and runs down the coils and is collected at the bottom and drained off by drain pipe 65 into the sump tank 17. The cooling coil passage is well insulated by the insulation 66 from the warm air which is at a temperature of about 100° F. in the upper section, and is heated partially by thermostatically controlled heater lamp 67. A thermostat 68 between the coil 64 and the insulation 66 turns the motor 69 on and off in the coil-temperature range between 40° and 50° F. Motor 69 operates the compressor 70 for the refrigerant circulated through the cooling coil, and the blower 71 which draws air from the lower section of the cabinet and blows it thru the cooling coil passage into the upper section where it is warmed up to maintain a low humidity in the upper section by continued circulation of the air from the upper section through the diaphragm passage 72 and back into the blower 71 as long as there is enough moisture in the air to warm up the cooling coils to a temperature of 50° F. maximum. Of course, when the ventilation through the chamber containing all the mixing cups 31 during each cycle of operation of the dispenser draws some air out of the upper section, it is replaced by a flow of air from the atmosphere into the lower section of the cabinet through the screened air inlet 63, and then through the cooling coil passage and/or passage 72 in the diaphragm into the upper section.

The reciprocating slide 48 is cyclically operated by motor 73 through linkage 74, and has a pivoted hook 75 mounted on it opposite each sprocket 47 and a light spring member $75^1$ normally holding the hook out of engagement with the sprocket, but operable by pushing the corresponding push button 14 to move the hook into engagement with the sprocket to turn the dispensing plate and dispose a measured charge of the solid ingredients into the mixing cup. Motor 73 also operates the dispenser micro 76 and the interrupter micro-switch 77 by two cams 78 and 79.

A slide valve bar or gate 80 is operated by a gate solenoid 81 through linkage 82 to open the dispensing openings in the top of the chamber containing all the mixing cups 31 under each chute 50 during the dispensing period.

The operating circuit is schematically shown in Fig. 23. When a coin is inserted in one of the coin slots 12, it completes the circuit of the corresponding solenoid 83 which lifts the interruptor pin 84 so that the push button may be operated and at the same time pin 84 releases switch 85 to complete the container dispenser circuit so that a container is dispensed. The customer places the container under the funnel in compartment 56 and then according to instructions for operation, presses the proper push button 14 which has now been released for operating the plunger 86 with its base plate 87 so as to move the hook 75 into engaging position with the sprocket 47 while at the same time tripping the bell crank 88 to close the selector switch 89 for starting the dispensing cycle, by moving past the shoulder 90 on the bell crank and permitting the spring 91 to turn the bell crank to switch closing position.

Closing of switch 89 operates the corresponding solenoid 92 in the camshaft motor casing 93 shown in the upper right hand corner of the cabinet. Solenoid 92 moves lever 94 (see Figures 16 and 19) closing switch 95 to start the camshaft motor 96 and moving switch 97, which is mounted on lever 94 into operative relation to the cam 98 which controls the operation of the water solenoid valves 33 and 39. As soon as the camshaft motor starts, roller 99 on cam 100 (see Figures 16 and 18) is moved out from under the hook bar 101 which hooks over the end of lever 94 to keep the motor 96 running for a complete revolution even though the interrupter circuit is broken to release the coin and deactivate solenoid 92, until the roller 99 returns to its original position moving the hook bar 101 (see Figures 16, 18 and 19) out to release lever 94 and permit the spring 102 to move switch 97 into inoperative position and open the switch 95 to stop the motor 96.

Other cams 103, 104 and 105 (see Figures 16, 17, 20 and 21) operated by motor 96 during the cycle, control the starting of the exhaust blower 62, the opening of gate 80, and the starting of the dispenser motor 73 and the cup tip motor 52 as indicated on the circuit diagram in Fig. 23, and the cam diagram in Fig. 21.

As was previously mentioned when the sump tank becomes about half full the springs 106 (see Figure 2)

on which it is hung expand sufficiently to cause the bottom of the tank to rest on the switch 107 in the base of the cabinet and thus break the power line connection to the machine as well as cause the main water supply valve 108 to close.

Many obvious modifications in the details and arrangements of parts may be made without departing from the spirit and scope of this invention as defined in the appended claims.

What is claimed is:

1. A hot-mixture dispensing machine characterized by mechanism having a brief cycle of dispensing at least one beverage or other liquid food for an individual serving, including hot water supply means at temperatures of 195 to 200° F., normal cold water supply means, a mixing cup, a dispensing container receiving chamber, means for starting said mechanism, automatic means for dispensing the hot water and the solid ingredients simultaneously into said mixing cup, means for simultaneously supplying a cold water portion from said cold water supply means directly into a dispensing container in said receiving chamber, and means for tipping the hot mixture in said mixing cup into said container after the solid ingredients have been subjected to the thorough soaking and solution in the substantially boiling hot water to produce a resulting mixture temperature of about 155° F. in said container, so that it may be safely handled.

2. A hot-mixture dispensing machine for individual servings of one or more mixtures, having a similar assembly of parts for dispensing each mixture, each assembly having a cycle of operation, means for starting said assemblies on their cycles selectively for any one of said mixtures, a mixing cup in each assembly, a chamber for receiving a dispensing container at the beginning of the cycle, means for simultaneously dispensing all of the solid ingredients for said serving and a portion of its water content at a temperature of approximately 195° F. into said mixing cup, means for dispensing the remaining portion of the water content at normal cold temperature directly into said dispensing container, and means for then tipping the mixing cup to spill its contents into said container to complete the mixture with a temperature of approximately 155° F.

3. An assembly for dispensing individual servings of hot-mixtures such as coffee or soups in dispensing containers, having a supply of hot water at approximately 195° F., a supply of cold water, a mixing cup, means for dispensing simultaneously all the solid ingredients for one serving and only a portion of the water from the hot supply to said mixing cup to thoroughly mix the solid ingredients in the very hot water portion for maximum solution and soaking thereof, to instantly and completely dissolve the soluble portion of said solid ingredients, means for dispensing the remaining portion of the water from the cold supply directly into the dispensing container, and means for tipping said mixing cup to deliver its contents into said dispensing container to complete the serving, said portions being so selected that the final mixture will have a temperature of approximately 155° F., so that it may be safely handled.

4. An assembly as defined in claim 3, a cabinet therefor, an enclosure forming a chamber around said mixing cup substantially sealing off said chamber from the rest of the cabinet, and means for exhausting the air in said chamber into the atmosphere to prevent contaminating the solid ingredients with moisture from the hot water vapors in said chamber into the solid ingredient containers and dispensing passages.

5. A cabinet and assembly as defined in claim 4, a funnel in the bottom of said enclosure for directing flow of the cold water and hot mixture into the dispensing container.

6. The combination of claim 5, the enclosure having an opening in the top for admitting ingredients dispensed into said cup, and a slide valve for closing said opening when the dispensing is over, means for dehumidifying and heating the air in said cabinet to about 100° F.

7. The combination of claim 6, having more than one assembly and a common chamber for all the mixing cups, with one exhaust means at one end of said chamber and an opening into said cabinet at the other end thereof for drawing in warm dry air from the cabinet to replace that which is exhausted.

8. The combination of claim 5, said cup and said funnel being easily removable for cleaning purposes.

9. The combination of claim 5, and means for keeping said mixing cup in tipped position between cycles of operation to prevent accumulations of deposits in the bottom of the cup.

10. The combination of claim 5, said hot water supply including a thermostatically controlled electrically heated hot water tank, a delivery line from the top of said tank to the hot water dispensing means, said delivery line being provided with a pressure gage, an air cushion and a safety pressure relief valve.

11. The combination of claim 10, including a diaphragm separating said cabinet into upper and lower sections at the level of said dispensing container position, a sump tank mounted on resilient support means in said lower section and drainage means from said diaphragm into said sump tank, said hot water tank being mounted in said lower section, said pressure gage, air cushion and relief valve being located in said upper section.

12. The combination of claim 11, and a push button safety switch under said sump tank operable by said sump tank when about half full to cut off the water supply at its source.

13. The combination of claim 12, said hot water tank and said cold water supply having a common source line of tap water, said source line being provided with a booster pressure pump and a pressure control means to maintain a steady supply pressure and to operate said booster pump when necessary to supplement a low tap water pressure.

14. The combination of claim 13, a power supply line for said hot water tank, said push button safety switch being operable to also cut off said power supply.

15. The combination of claim 14, solenoid valves in said water dispensing means, an electric operating circuit for said solenoid valves connected to said power line, and timer means for controlling the cycle of operation of said circuit.

References Cited in the file of this patent
UNITED STATES PATENTS

| | | |
|---|---|---|
| 656,489 | Strater | Aug. 21, 1900 |
| 1,235,791 | Gebhart et al. | Aug. 7, 1917 |
| 2,558,522 | Knapp | June 26, 1951 |
| 2,660,351 | Thompson | Nov. 24, 1953 |
| 2,682,984 | Melken et al. | July 6, 1954 |
| 2,685,393 | Thompson | Aug. 3, 1954 |

FOREIGN PATENTS

| | | |
|---|---|---|
| 64,739 | Germany | Sept. 27, 1892 |